United States Patent [19]

Kingsley et al.

[11] 4,441,612

[45] Apr. 10, 1984

[54] EASY OPEN CARTON

[75] Inventors: Richard T. Kingsley, Penfield; Larry Sherman, Macedon, both of N.Y.

[73] Assignee: Eastman Kodak Company, Rochester, N.Y.

[21] Appl. No.: 230,094

[22] Filed: Jan. 29, 1981

[51] Int. Cl.³ ............................................. B65D 5/54
[52] U.S. Cl. ..................................... 206/620; 229/41 B
[58] Field of Search ................ 229/33, 41 B; 206/620, 206/634, 610, 611, 616

[56] References Cited

U.S. PATENT DOCUMENTS

| | | | |
|---|---|---|---|
| 1,724,636 | 8/1929 | Bell | 229/33 |
| 2,038,893 | 4/1936 | Davidson | 229/33 X |
| 2,363,861 | 11/1944 | Goodyear | 206/631 |
| 2,776,083 | 1/1957 | Derman | 229/41 B |

Primary Examiner—Stephen P. Garbe
Attorney, Agent, or Firm—M. S. Sales

[57] ABSTRACT

A carton comprises first and second rectilinear side walls which are hingedly connected together along one of each of their edges. A third side wall structure, which may comprise one or more individual walls, is hingedly connected to second edges of the first and second side walls. The carton is completed by opposed end walls which are connected to the second side wall and to the third side wall structure, but not to the first side wall. A tear line extends across the second side wall to both ends of that wall's connection with the first side wall. When the tear line is severed, the first side wall and a portion of the second side wall are disengaged from the other portion of the second side wall. Additional tear line structure is provided in the second side wall between the first tear line and the remaining two corners of the second side wall, whereby the carton may be open flat when the tear line 4-structure are severed.

5 Claims, 7 Drawing Figures

EASY OPEN CARTON

BACKGROUND OF THE INVENTION

1. Field of the Invention

The present invention relates to cartons, and more particularly to cartons formed from blanks provided with tear lines for quick and convenient opening.

2. Description of the Prior Art

It has long been known to construct rectilinear cartons of folded and glued fiberboard or paper blanks which are formed with tear lines along predetermined paths. Such containers are disclosed in U.S. Pat. Nos. 2,155,791 and 2,363,861.

The present invention is an improvement over such known cartons in that one side wall of the carton can be raised to open the carton when a single tear line, which extends between two corners of that wall, is torn. Additional tear line structure enable the carton to be flattened completely.

SUMMARY OF THE INVENTION

In accordance with the present invention, a carton comprises first and second hingedly connected, rectilinear side walls. Third side wall structure is hingedly connected to both the first and second side walls. The carton is completed by opposed end walls which are connected to the second side wall and the third side wall structure, but not to the first side wall. A tear line extends across the second side wall to the two adjacent corners of the first side wall. When the tear line means is severed, the first side wall and a first portion of the second side wall are disengaged from a second portion of the second side wall so that the first side wall can be raised to open the carton.

Additional tear line structure may be provided in the second side wall between the first tear line and the adjacent two corners of the third side wall structure. When the additional tear line structure is severed, the carton can be opened flat.

Cartons of the type to which the present invention relate are particularly adapted for packaging consumer articles which are usually accompanied by information such as a parts list, operating instructions, etc. printed on an enclosed sheet of paper. The carton of the present invention is adapted to provide the consumer with such information on the carton itself in a manner that the information is readily available and saves the cost of packing the separate paper into the carton. One envisioned use for the carton is for holding a magazine of photographic film. Exposure setting information might be printed on the carton's interior walls.

The invention, and its object and advantages, will become more apparent in the detailed description of the preferred embodiment presented below.

BRIEF DESCRIPTION OF THE DRAWINGS

In the detailed description of the preferred embodiment of the invention presented below, reference is made to the accompanying drawings in which.

DETAILED DESCRIPTION OF THE PREFERRED EMBODIMENT

Figure 1:
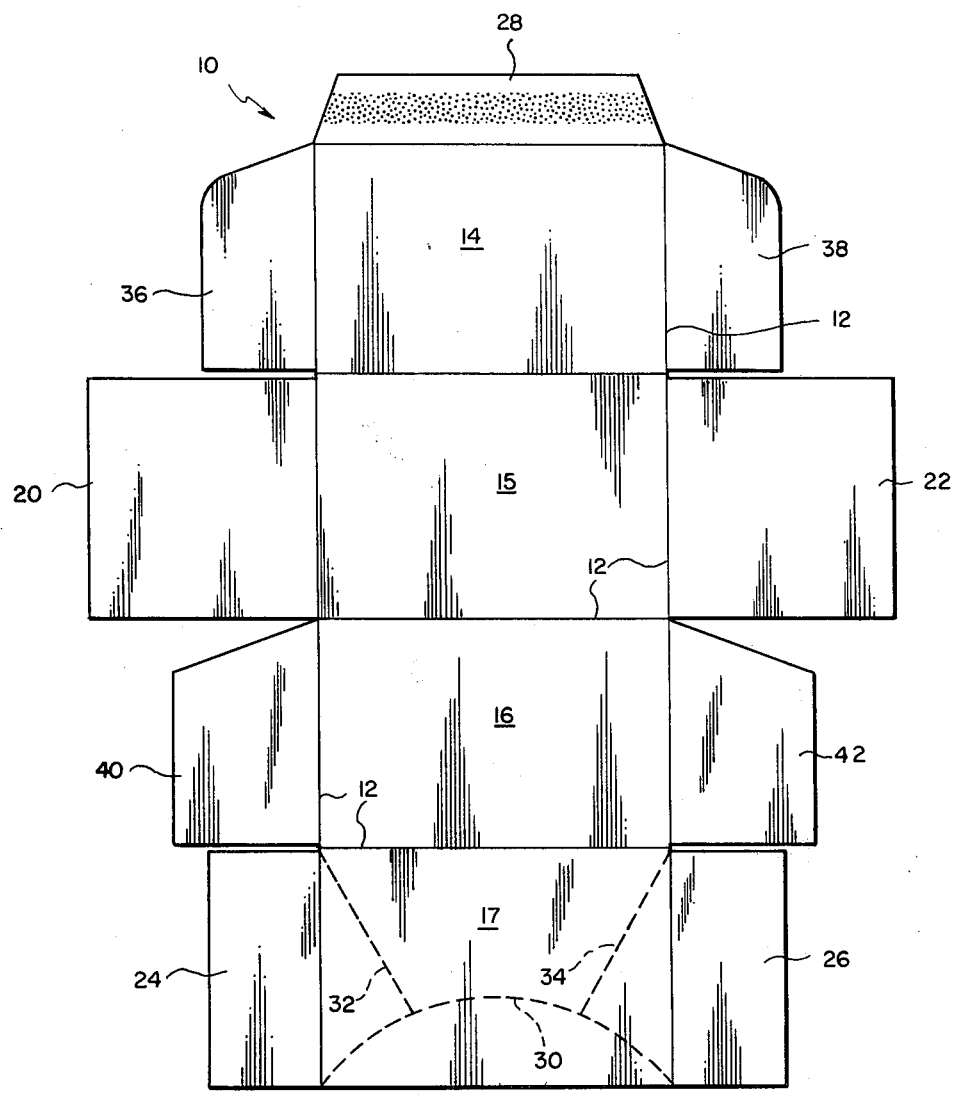
FIG. 1 is a plan view of the outside of a carton blank in accordance with the present invention.
Figure 2:
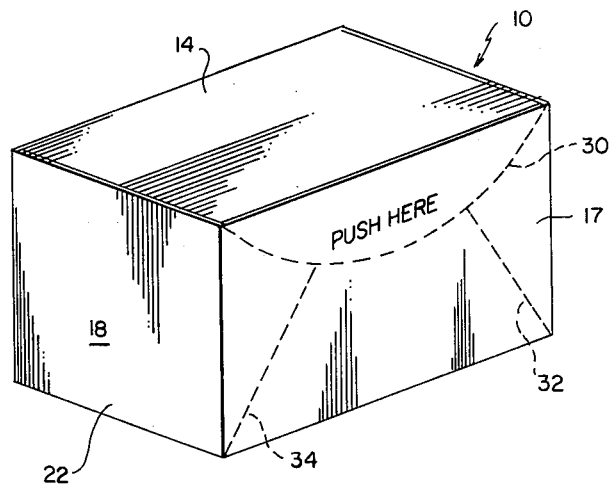
FIG. 2 is a perspective view of a carton set up from the blank shown in FIG. 1.

FIG. 1 shows a suitable fiberboard blank 10 of a material which may be easily scored, cut, and perforated, and which has been cut to a desired shape to form the carton illustrated in FIG. 2. Blank 10 has been scored or creased such as along lines 12 to form separate, hingedly connected panels which, when the blank is folded, form side walls and end walls of the carton.

In the present description of the carton, specific names have been applied to the side and end walls. However, it is to be understood that terms such as side, end, top, bottom, front, and back are used with respect to the particular orientation illustrated and may apply to any wall area. Accordingly, walls 14, 15, 16, and 17 will be referred to respectively as the top, rear, bottom, and front walls of the carton and will be referred to as the side walls, collectively. In like manner, wall 18, shown in FIG. 2, and its opposed wall, not shown, will be referred to as the end walls of the carton. Each end wall is made up of a plurality of panels.

Figure 3:
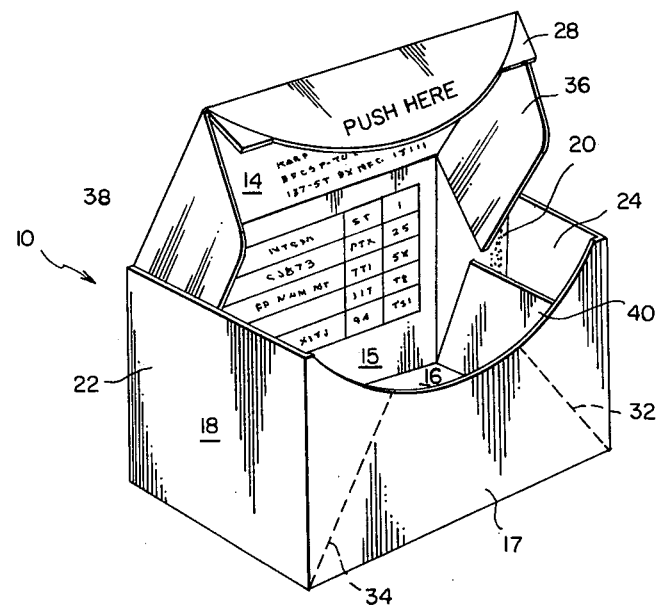
FIG. 3 is a view of the carton of FIG. 2 with the top partially opened.

Each side wall 14–17 has a plurality of panels hingedly connected thereto. The panels which extend laterally from the side walls as viewed in FIG. 1 will, when the carton is set up, form the carton's end walls. The inner surfaces of panels 20 and 22 are partially coated with a suitable adhesive, and will overlie panels 24 and 26, collectively, and be adhered thereto when the carton has been set up, as shown in FIG. 3. Panel 28 carries adhesive on its outer surface and underlies front wall 17 when the carton is set up.

To enable the carton to be opened quickly, suitable lines of weakness, or tear lines, are provided in front wall 17 by, for example, perforating the blank. Such lines of weakness include a first tear line structure (such as tear line 30) and second tear line structure including tear lines 32 and 34. Tear line 30 extends across front wall 17 to the adjacent two corners of top wall 14, as shown in FIG. 2 to divide wall 17 into two portions. Tear lines 32 and 34 extend from tear line 30 to the adjacent two corners of bottom wall 16 to divide the lower portion of wall 17 into three regions.

Once set up, the carton may be readily opened by merely pushing on the region at the top of front wall 17 to sever tear line 30, and by thereupon lifting top wall 14 to the position shown in FIG. 3. Since top wall 14 is not connected to either of the end walls except by non-adhered panels 36 and 38, and is hingedly connected only to rear wall 15, the top wall can be opened fully to remove the contents of the carton upon severing tear line 30.

Figure 4:
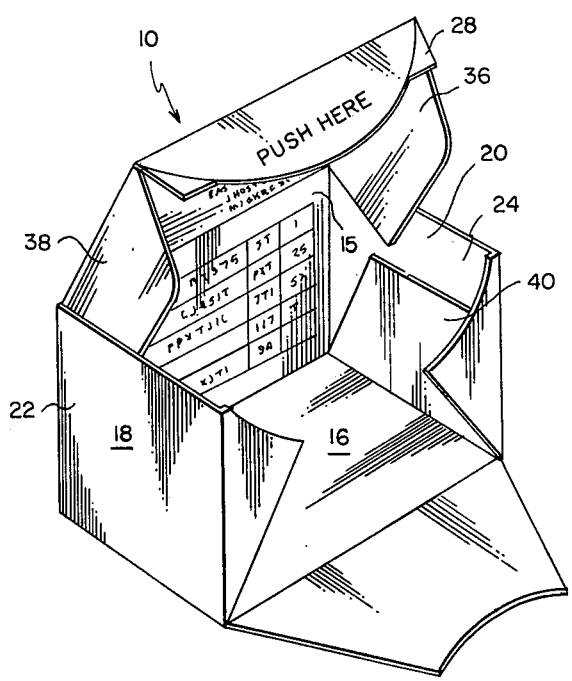
FIG. 4 is a view of the carton of FIGS. 2 and 3 with the front open.
Figure 5:
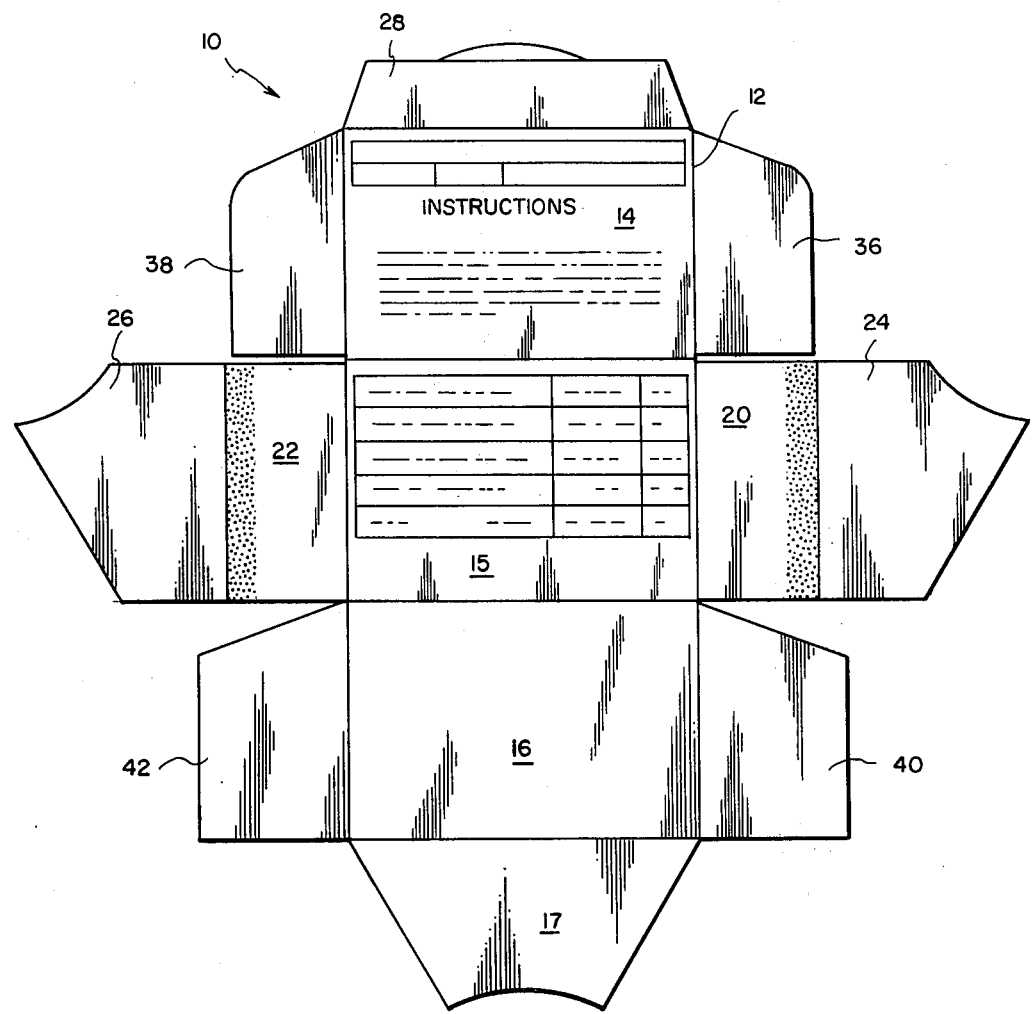
FIG. 5 is a plan view of the inside of the opened carton of FIGS. 2-4.

As mentioned hereinbefore, the carton may be adapted to provide information useful to the consumer. Such information is printed on the inside surface of blank 10, and access to it is provided by severing tear lines 32 and 34 to permit unfolding carton front wall 17 as shown in FIG. 4. Since bottom wall 16 is not connected to either end wall except by non-adhered panels 40 and 42, the bottom wall can be unfolded so that the carton blank once again lies flat as shown in FIG. 5. Any information printed on the interior of the carton's blank would thereupon be readily available to the consumer.

Figure 6:
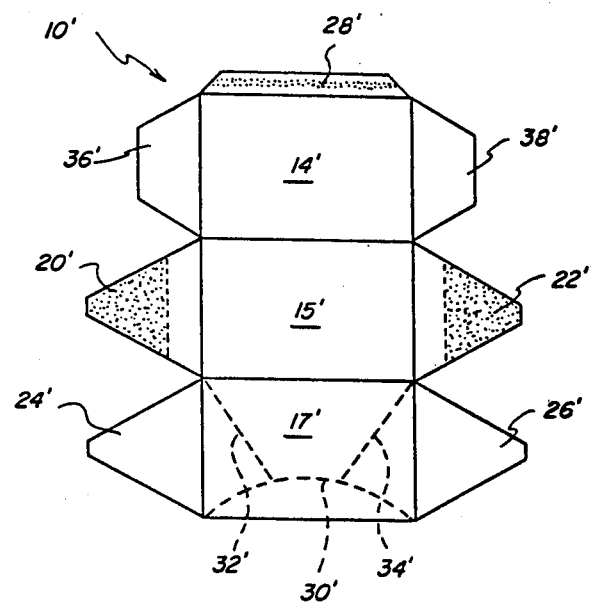
FIG. 6 is a plan view of the outside of a carton blank in accordance with another embodiment of the present invention.
Figure 7:
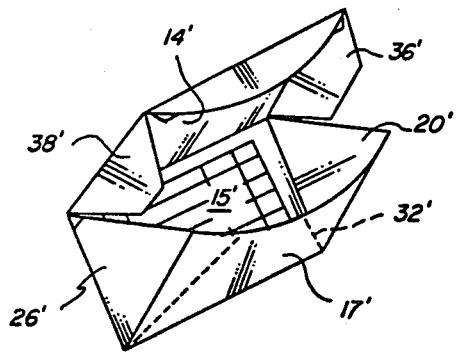
FIG. 7 is a perspective view of a carton set up from the blank shown in FIG. 6 with the top partially opened.

The invention has been described in detail with particular reference to a preferred embodiment thereof, but it will be understood that variations and modifications can be effected within the spirit and scope of the invention. For instance, the carton has been shown with a rectilinear cross-sectional shape in FIGS. 1–5. Other shapes could be used, such as for instance triangular as shown in FIGS. 6 and 7, wherein the side wall structure made up of rear wall 15 and bottom wall 16 in the FIGS. 1–5 embodiment could be comprised of a single wall 15' hingedly connected to walls 14' and 17'. Other elements of the FIGS. 6 and 7 embodiment which correspond to elements of the FIGS. 1–5 embodiment have been labeled with the same reference characters, but with prime marks.

We claim:

1. A carton comprising:
   first and second hingedly connected rectangular side walls;
   third side wall structure hingedly connected to both said first and second side walls;
   first and second opposed end walls hingedly connected to said second side wall and said third side wall structure, but not to said first side wall, whereby said walls and said wall structure form an enclosure;
   first tear line structure extending across said second side wall to the corners of said first side wall adjacent to said second side wall, whereby said first side wall and a first portion of said second side wall can be disengaged from a second portion of said second side wall, said second portion including first, second, and third regions connected to said first end wall, second end wall, and third side wall structure, respectively, so that said first side wall can be moved to open the carton when said tear line structure is severed; and
   second tear line structure extending from said first tear line structure to the corners of said third side wall structure adjacent to said second side wall, whereby said first and second regions of said second portion can be disengaged from the said third region of said second portion so that said carton can be opened flat when both said first and second tear line structures are severed.

2. A carton comprising:
   first, second, third, and fourth rectangular side walls hingedly connected in sequence along parallel edges;
   first and second opposed end walls connected to edges of said second and fourth side walls and not to edges of said first side wall, whereby said walls and said walls means form an enclosure; and
   first tear line structure extending across said second side wall to both ends of the adjacent edge of said first side wall, whereby said first side wall and a portion of said second side wall can be disengaged from the portion of said second side wall which is connected to said opposed end walls so that said first side wall can be moved to open the carton when said tear line structure is severed; and
   second tear line structure extending from said first tear line structure to both ends of the edge of said third side wall adjacent to said second side wall, whereby the portion of said second side wall adjacent to each hinge connection to said end walls can be disengaged from the portion of said second side wall adjacent to the hinge connection to said third side wall so that said carton can be opened flat when both said first and second tear line structures are severed.

3. A carton blank comprising:
   first, second, third, and fourth aligned side walls hingedly connected between said first and second, said second and third, and said third and fourth side walls;
   a sealing panel hingedly connected to said first side wall and aligned with said walls for sealing to a first portion of said fourth side wall;
   tear line structure extending across said fourth side wall whereby said first portion of said fourth side wall can be separated from a second portion of said fourth side wall, said second portion being hingedly connected to said third side wall;
   second and third sealing panels hingedly connected to said second side wall and extending laterally to the direction of alignment of said side walls;
   fourth and fifth sealing panels hingedly connected to said second portion of said fourth side wall and extending laterally to the direction of alignment of said side walls for sealing to said second and third sealing panels, respectively; and
   second tear line structure on said second portion of said fourth side wall for separating said fourth and fifth sealing flaps from the hinge connection between said fourth and third side walls.

4. A rectilinear carton formed of a folded and glued blank, said carton comprising:
   four rectangular, connected side walls;
   a pair of end walls comprising overlapping and glued together panels folded from opposed first and second of said side walls;
   first weakened tear line structure extending across said first opposed side wall to the corners of a third side wall adjacent to said first side wall, whereby said tear line structure may be severed to enable said third side wall to be opened to expose the carton interior; and
   second weakened tear line structure extending from said first mentioned tear line structure to the corners of the fourth side wall adjacent to said first side wall, whereby said second tear line structure may be severed to enable said carton blank to be unfolded and flattened.

5. A rectilinear carton formed of a folded and glued blank, said carton comprising:
   bottom, top, front, and rear walls;
   panels on said front and rear walls overlapped and glued to provide a pair of end walls, whereby all said walls form a rectangular enclosure;
   a weakened tear line joining the corners of said top wall adjacent to said front wall, whereby said tear line may be severed to enable said top wall to be raised to open said carton; and
   tear line structure joining said first mentioned tear line and each corner of said front wall adjacent said bottom wall.

* * * * *